Patented Apr. 25, 1950

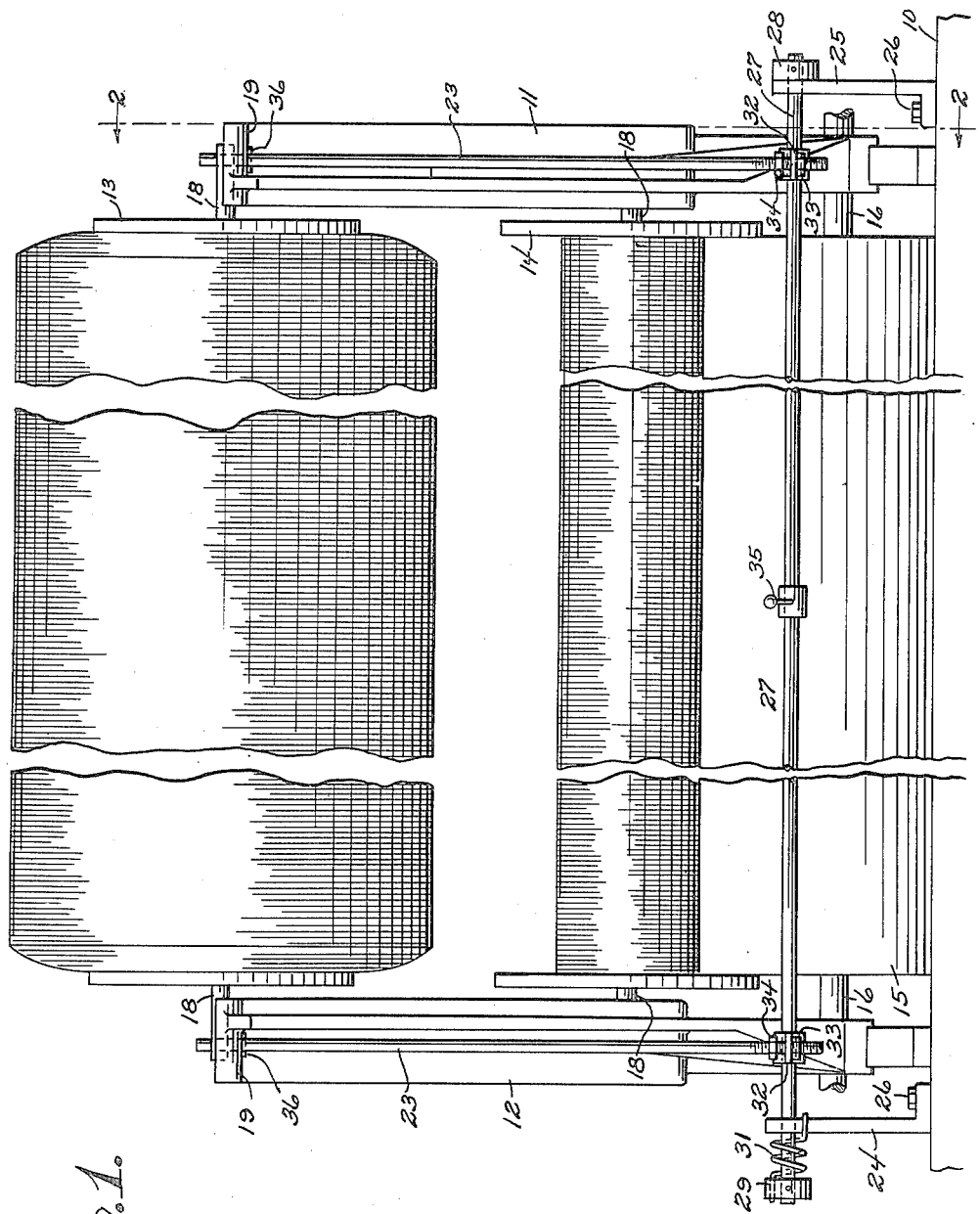

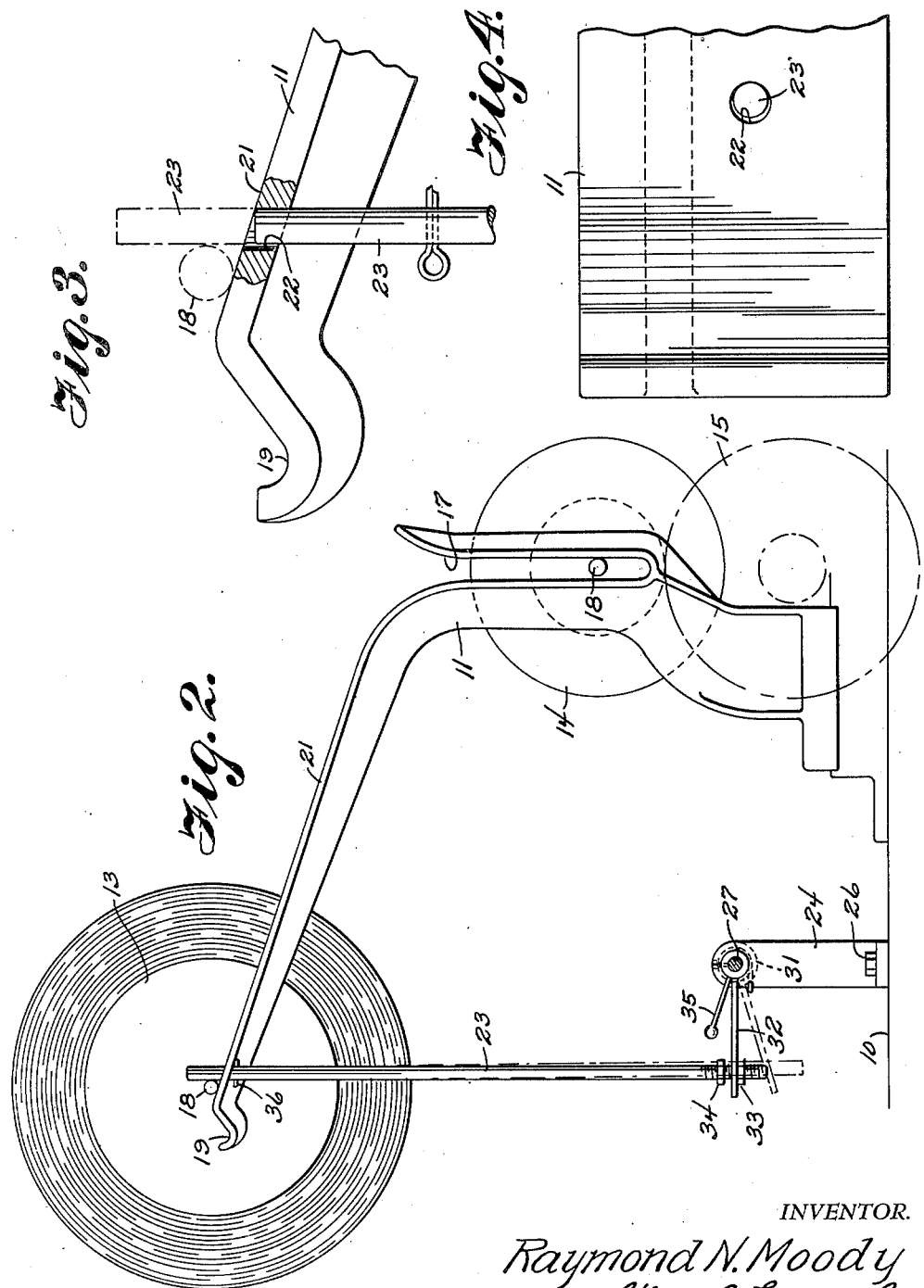

2,505,567

UNITED STATES PATENT OFFICE 2,505,567

SPOOL RELEASE FOR SPINNING FRAMES

Raymond N. Moody, Auburn, Maine

Application August 25, 1948, Serial No. 46,017

3 Claims. (Cl. 57—1)

This invention relates to a spool stand for spinning machines.

It is an object of the present invention to provide a spinning machine spool stand with attachment comprising rods adapted to be extended upwardly through the upper ends of the supporting arms for a spool to retain the spool in place on the arms but which when withdrawn or depressed will automatically allow the spool to travel down the arms and into slots on the arms for engagement with the driving rolls and whereby the lifting of the roving spool once secured in place on the supporting arms is avoided and unnecessary.

Other objects of the present invention are to provide a spool stand arrangement for spinning machines having releasable elements for supporting the spool on the stand, which is of simple construction, easy to operate, inexpensive to manufacture, has few parts and efficient in operation.

For other objects and for a better understanding of the invention, reference may be had to the following detailed description taken in connection with the accompanying drawing, in which Fig. 1 is a front elevational view of the spool stand with the spools in place and of the attachment associated therewith and embodying the features of the present invention.

Fig. 2 is an end elevational view of the spool stand taken generally on line 2—2 of Fig. 1.

Fig. 3 is an enlarged fragmentary view of the other end of the supporting arms which is broken away to show the manner in which the retaining rod is extended through the same.

Fig. 4 is a top plan view of the upper end of the supporting rod.

Referring now to the figures, 10 represents a base on which is fixed two laterally extending supports spaced from one another and as indicated at 11 and 12 for supporting roving drums 13 and 14. The roving drum 14 is held in engagement with a driving roller 15 having shaft extensions 16 connected with a power source and journalled respectively in brackets on the base 10. The roving drum 14 is held in an elevated position in readiness to be dropped into place when the drum 13 has been relieved of its roving and has been removed from the supports.

Each supporting arm has a slot 17 for receiving trunnions 18 of each drum. These slots extend vertically and permit the drum to drop automatically onto the driving roller 15 as the material on the drum is used up. When the drum or spool has become empty, the same will be relieved of considerable weight and can be easily elevated out of the slots 17 to clear the way for the new drum 14.

Heretofore, the elevated drum 14 was carried in dropped hook formations 19 on the ends of the supporting arms but this required that the drum be elevated at least an inch in order to place it on the incline 21 of the supporting arm. Thus the operator had to bodily lift the drum each time a new supply was needed. This required the operator to be strong because it required the drums to be lifted even after they had been placed on the supporting arms.

According to the present invention, I provide openings 22 in the upper ends of the arms 11 and 12 through which are extended retaining rods 23 against which the trunnions 18 rest while retaining the drum or spool in the elevated position. On the base there are provided bearing brackets 24 and 25 laterally spaced from one another and secured to the base by bolts 26. A shaft 27 is journalled in these brackets and retained against axial displacement therefrom by end collars 28 and 29. Between the end collar 29 and the bracket 24 is a return spring 31. Extending outwardly from the shaft 27 are arms 32 through which the lower ends of the rods 23 extend and to which they are secured by lock nuts 33 and 34. The rods can accordingly be adjusted to different vertical heights so as to extend different distances above the supporting arms. Intermediate the length of the shaft 27 is an operating handle 35 which when depressed will cause the arms 32 to be lowered and the rods 23 drawn downwardly to release the trunnions and the drum 14. When this has been accomplished, the drum will roll down the incline 21 and into the slot 17 for engagement with the driving roller 15. Upon release of the operating handle 35, the return spring 31 will elevate the rods 23. To provide a stop to limit the upward movement of the rods 23 through the openings 22 of the supporting arms are cotter pins 36 in the respective rods. Instead of the trunnions 18 being placed in the hook formations 19, they are accordingly placed on the incline edge 21 itself and against the upper ends of the rods 23, Fig. 2. Little strength is required to release the drum and the operation is effected merely by depressing the operating handle 35.

While various changes may be made in the detail construction, it shall be understood that such changes shall be within the spirit and scope

I claim:

1. A spool stand for roving spools comprising vertically extending supports having inclined offset portions and slots at the ends of the inclined portions for receiving the spools, and releasable means engageable with the upper ends of the inclined edge portions of the supports for retaining the roving spool in an elevated position thereon and which upon release will automatically free the roving spool to permit it to pass to the slots, and said releasable means comprising rods, said supports having openings receiving the rods and through which the rods may be extended or retracted, bearing brackets adapted to be secured to a base, a shaft journalled on said brackets, an operating handle connected to said shaft to rotate the same, arms extending laterally from the shaft and connected to the lower ends of said rods whereby as the operating arm is depressed, the release rods will be retracted to free the roving drum.

2. A spool stand as defined in claim 1 and means for adjustably connecting the lower ends of said release rods to the arms whereby they may be adjusted to different distances through the upper ends of the supports.

3. A spool stand arrangement as defined in claim 1 and stop elements on the upper ends of the rods for limiting the upward movement of the rods through the supports and a return spring connected between the shaft and the mounting brackets for effecting the return of the rods to their elevated positions upon the operating handle being released.

RAYMOND N. MOODY.

REFERENCES CITED

The following references are of record in the file of this patent:

UNITED STATES PATENTS

| Number | Name | Date |
|---|---|---|
| 1,872,045 | Smitmans | Aug. 16, 1932 |
| 1,889,839 | Owen | Dec. 6, 1932 |
| 2,067,250 | Taylor | Jan. 12, 1937 |